United States Patent [19]

Heller et al.

[11] 4,402,725

[45] Sep. 6, 1983

[54] FERTILIZERS

[75] Inventors: Harold Heller; Dietmar Schäpel; Claus Hentschel, all of Cologne; Manfred Dahm, Leverkusen, all of Fed. Rep. of Germany

[73] Assignee: Bayer Aktiengesellschaft, Leverkusen, Fed. Rep. of Germany

[21] Appl. No.: 241,325

[22] Filed: Mar. 6, 1981

[30] Foreign Application Priority Data

Aug. 23, 1980 [DE] Fed. Rep. of Germany ....... 3031893

[51] Int. Cl.$^3$ .............................................. C05G 3/00
[52] U.S. Cl. ............................................ 71/27; 71/1; 71/903; 71/904; 71/DIG. 2; 47/1 R; 47/DIG. 4; 210/686
[58] Field of Search ................. 71/1, 11, 27, 903, 904, 71/DIG. 2; 47/1 R, DIG. 4; 521/28, 30; 424/82; 528/254; 210/686

[56] References Cited

U.S. PATENT DOCUMENTS

| | | | |
|---|---|---|---|
| 3,082,074 | 3/1963 | Handley | 71/1 |
| 3,645,922 | 2/1972 | Weiss et al. | 210/686 |
| 3,980,462 | 9/1976 | Corte et al. | 71/1 |
| 4,036,788 | 7/1977 | Steckler | 71/27 X |
| 4,160,754 | 7/1979 | Schapel et al. | 424/82 X |

*Primary Examiner*—Ferris H. Lander
*Attorney, Agent, or Firm*—Sprung, Horn, Kramer & Woods

[57] ABSTRACT

A fertilizer for the long term and uniform supply of plants with nutrient ions comprising a covalently crosslinked hydrogel in which are embedded ion exchangers which are laden with plant nutrients; furthermore a process for the long term and uniform supply of plants with nutrient ions wherein a covalently crosslinked hydrogel in which are embedded ion exchangers which are laden with plant nutrients is applied to the plants or their environment.

22 Claims, No Drawings

FERTILIZERS

The invention relates to fertilisers comprising a water-containing gel (hydrogel) and nutrient-laden ion exchangers.

Artificial substrates containing plant nutrients are known. Thus, for example, U.S. Pat. Nos. 2,988,441 and 3,373,009 describe foams which are suitable as plant growth media and which consist of a water-insoluble, stable, at least partially open-pore matrix material in which mixtures of nutrient-laden cation exchangers and anion exchangers, or mixtures of nitrate ion-laden anion exchangers and sparingly soluble fertilisers are fixedly embedded. Polyurethane foams, epoxide foams, rubber foams and vinyl resin foams are mentioned as matrix materials. Such foams containing plant nutrients are admittedly suitable as inert materials for soil-less plant growth, but not as universally applicable fertilisers, because the release of the nutrients from these foams is excessively diffusion-hindered when the materials are used as fertilisers. For adequate nutrient supply to the plants, which permits satisfactory growth, it is necessary that the plant roots should be able to penetrate into the foam and should in this way be able to come into close contact with the nutrient-containing ion exchangers and sparingly soluble fertilisers. If this precondition is not met, insufficient progressive supply of the nutrients from the ion exchangers and sparingly soluble fertilisers embedded in the foam can easily result, due to severe diffusion hindrance, hence resulting in reduced plant growth or in specific deficiency phenomena on the plants.

Hydrogels containing plant nutrients are furthermore known. For example, European patent application No. 0,006,299 describes non-crosslinked nutrient-containing hydrogels as growth media for plants. These hydrogels are thixotropic and can therefore only be employed for certain purposes, especially as plant growth medium, if additional auxiliaries are used to retain the external shape. A further important disadvantage of these gels is that their structure can easily collapse under the influence of the incorporated fertiliser salts. This disadvantage can be only partially overcome, but not eliminated with the requisite reliability, by the use of sparingly soluble inorganic or organic plant nutrients or of encapsulated nutrients with delayed nutrient release, for example so-called depot fertilisers (see the corresponding data in the patent application, on page 3 and page 9).

DT-OS (German Published Specification) No. 2,521,277 discloses the possibility of including plant nutrients and fertilisers in a gel when preparing special polyurethane-polyurea hydrogels. However, it has been found that fertilisers of this type can only be employed to a limited extent. If water-soluble nutrient salts are employed in their preparation, these diffuse very rapidly out of the gel when the hydrogels are used. This leads to the known adverse secondary phenomena. When using the hydrogels in the open, the nutrient salts liberated are very largely washed out into the subsoil and are consequently lost; if the hydrogels are used in sub-irrigation methods, excessive salt concentrations in the nutrient solutions can result, so that the plant suffers salt damage. If, however, sparingly soluble inorganic or organic nutrients or depot fertilisers having a slow-release action are used in the preparation of these hydrogels, greatly delayed nutrient release is observed. This can lead to inadequate nutrient supply in the case of plants having a high nutrient demand.

It has now been found that fertilisers, based on hydrogels containing plant nutrients, which possess high structural stability even under the influence of the plant nutrients, and from which the nutrients can, without diffusion hindrance, be liberated in the optimum amount, and at the optimum speed, for the plants, both when used in the soil and when used in hydrocultures, are obtained if ion exchangers laden with plant nutrients are embedded in covalently crosslinked hydrogels.

U.S. Pat. No. 3,645,922 discloses covalently crosslinked hydrogels which contain mixtures of specific weakly basic and weakly acidic pulverulent ion exchangers. However because of their special property of adsorbing ions from solutions at a low temperature and of being capable of regeneration by elution with water or sodium chloride solution at a temperature above the adsorption temperature, these so-called ion exchanger composition materials have been proposed exclusively for water treatment technology, for the purpose of softening and desalinating highly saline waters.

The invention therefore relates to fertilisers based on hydrogels containing plant nutrients; the fertilisers are characterised in that they contain ion exchangers which are laden with plant nutrients and are embedded in covalently crosslinked hydrogels.

The invention further relates to a process for the preparation of fertilisers based on hydrogels containing plant nutrients; the process is characterised in that ion exchangers laden wih plant nutrients are embedded in covalently crosslinked hydrogels.

Ion exchangers laden with plant nutrients are known; they are described, for example, in U.S. Pat. No. 3,082,074, in German Pat. No. 2,338,182 and in E. J. Hewitt "Sand and Water Culture Method used in the Study of Plant Nutrition", Commonwealth Agricultural Bureaux, Techn. Communication No. 22, 2nd Edition, 1966, page 61 et seq.

Inorganic ion exchangers, natural and modified natural ion exchangers, such as lignite and sulphonated lignite, and synthetic resin ion exchangers are suitable for loading with plant nutrients. Synthetic resin ion exchangers are preferred, because of their higher capacity. The synthetic resin ion exchangers can be gel-like or macroporous and can be polymerisation resins or condensation resins. Synthetic resin ion exchangers usable in the fertilisers according to the invention are the known weakly basic, moderately basic and strongly basic anion exchange resins possessing primary, secondary and/or tertiary amino groups and/or quaternary ammonium, sulphonium or phosphonium groups, weakly acidic, moderately acidic and strongly acidic cation exchange resins possessing phenolic hydroxyl groups, carboxylic acid groups, phosphinic acid groups, phosphonic acid groups and/or sulphonic acid groups, and the chelate resins which form chelate complexes and possess, for example, aminocarboxylic acid groups or aminophosphonic acid groups.

Ion exchangers of the stated type are known. They, and their preparation, are described, for example, in F. Helfferich, Ionenaustauscher ("Ion Exchangers"), Volume 1, 1959, pages 10 to 106, and Ullmanns Enzyklopädie der technischen Chemie (Ullmanns Encyclopaedia of Industrial Chemistry), 4th edition, Volume 13, 1977, pages 292 to 309.

Chelate resins with aminophosphonic acid groups, and their preparation, are described, for example, in British Pat. No. 859,834.

The loading of the ion exchangers with nutrients is carried out, for example, in accordance with the processes described in U.S. Pat. No. 3,082,074, German Pat. No. 2,338,182 or DT-OS (German Published Specification) No. 3,020,422.

The nutrient-laden ion exchangers used are preferably mixtures of anion exchangers laden with nutrient anions and cation exchangers laden with nutrient cations. Mixtures which contain anion exchangers laden with anionic chelate complexes of micro-nutrient cations and with further macro-nutrient anions and micro-nutrient anions are particularly preferred. In the ion exchanger mixtures, the ratio of laden anion exchanger to laden cation exchanger is advantageously chosen to be such that the amount of acidic groups is 10 to 90%, preferably 10 to 50%, relative to the sum of the acidic and basic groups of the mixture.

The ion exchangers are present in the fertilisers according to the invention in such amount that the weight ratio of ion exchanger to hydrogel is 10:90 to 90:10, preferably 30:70 to 70:30.

The covalently crosslinked hydrogels to be used in the fertilisers according to the invention can be prepared from a great diversity of gel-forming substances. As examples of gel-forming substances there may be mentioned: gel-forming natural materials, such as gelatin and pectin, semi-synthetic products, such as cellulose derivatives, for example carboxymethylcellulose, or synthetic gel-forming substances, such as polyvinyl alcohol, aqueous dispersions of polyethers with terminal-N-alkylol groups, such as are described in U.S. Pat. No. 4,160,754, and preferably, polyisocyanate prepolymers.

The covalent crosslinking of the gel-forming substances takes place in accordance with processes which are in themselves known, using crosslinking agents which are in themselves known, such as are described, for example, in U.S. Pat. No. 3,645,922.

The content of macromolecular substance in the hydrogels to be used in the fertilisers according to the invention is at least 5% by weight, preferably 5 to 40% by weight, relative to the total weight of the hydrogel.

Within the framework of the present invention, macromolecular substance is to be understood as the sum of gel-forming substance and crosslinking agent. The amount of crosslinking agent depends on the number of crosslinkable groups present in the molecule of the gel-forming substance and on the crosslinking density required for the particular properties of the gel. The crosslinking agent can be employed either in the stoichiometric ratio or in an excess or less than stoichiometric amount relative to the crosslinkable groups present in the molecule. In general, the weight ratio of gel-forming substance to crosslinking agent in the macromolecular substances to be used to prepare the hydrogel is 1:0.01 to 0.5, preferably 1:0.03 to 0.3. The wide range of variation of the weight ratios results from the different structure of the gel-forming substances which can be employed according to the invention, and the different crosslinking densities, needed to give the desired gel properties, of the macromolecular substances. Within the framework of the present invention, crosslinking densities are understood as the mean molecular weights of the parts of the molecule located between the crosslinking points. The crosslinking densities of the macromolecular substances to be used according to the invention are about 100 to 1,500.

Covalently crosslinked polyurethane-polyurea gels have proved particularly suitable for the preparation of the hydrogels to be used in the fertilisers according to the invention. These gels can be employed as such or with the addition of other gel-forming substances which are in themselves known, for example carboxymethylcellulose, gelatin or alginates. In these polyurethane-polyurea gels modified with other gel-forming agents, the weight ratio of polyurethane-polyurea to other gel-forming substances is advantageously 1:0.03 to 0.3, preferably 1:0.05 to 0.1.

These preferentially used polyurethane-polyurea hydrogels are obtainable by reaction of prepolymers and/or semi-prepolymers with water, and during gel formation polyhydric alcohols tolerated by plants, such as glycerol or sorbitol, may also be added. The prepolymers and semi-prepolymers have isocyanate end groups and are prepared in a manner which is in itself known by reaction of polyethers, which contain at least 30% by weight of ethylene oxide units, with an excess amount of diisocyanate and/or polyisocyanate. In this reaction, the amount of diisocyanate and/or polyisocyanate is preferably so chosen that the NCO/OH ratio is 2 to 10, depending on the desired properties of the prepolymer type to be produced. The content of isocyanate groups in the prepolymer or semi-prepolymer is advantageously 2 to 10% by weight, preferably 3 to 5% by weight, relative to the weight of the prepolymer or semi-prepolymer.

The starting materials for the prepolymers or semi-prepolymers are polyethers which possess at least two active hydrogen atoms, have a molecular weight of 500 to 10,000, preferably 2,000 to 8,000, and contain at least 30% by weight of ethylene oxide groups, relative to the weight of the polyether. Such polyethers are prepared by reaction of compounds possessing reactive hydrogen atoms, for example dialcohols or polyalcohols, diphenols or polyphenols or aliphatic or aromatic diamines or polyamines, with ethylene oxide and, optionally, alkylene oxides such as propylene oxide, butylene oxide, styrene oxide, epichlorohydrin or mixtures of these alkylene oxides.

Further starting compounds for the prepolymers or semi-prepolymers are aliphatic, cycloaliphatic, araliphatic, aromatic or heterocyclic polyisocyanates, such as are described, for example, by W. Wiefgen, Liebigs Annalen der Chemie, Volume 562, pages 75–136.

The fertilisers according to the invention can contain all essential macro-nutrients and micro-nutrients, with anionic nutrients, such as nitrate, phosphate, sulphate, molybdate and borate, being bonded to anion exchangers and cationic nutrients, such as potassium, ammonium, calcium and magnesium, being bonded to cation exchangers. Micro-nutrients, such as iron, manganese, copper or zinc, can be bonded as cations to cation exchangers or as anionic chelate complexes to anion exchangers. Preferably, the fertilisers according to the invention contain the macro-nutrients nitrogen, phosphorus and potassium which are particularly important for healthy development of the plants; nitrogen may be present as nitrate and ammonium nitrogen in the molar ratio of 90:10 to 50:50, phosphorus as dihydrogen phosphate or hydrogen phosphate, the micro-nutrients boron as borate and molybdenum as molybdate, and iron, copper, manganese and zinc as anionic chelate complexes.

The ratio of the amounts of the individual nutrients can vary within wide limits and can be selected to correspond to the special nutrient requirements of the various species of plants. Particularly suitable ratios are described in the literature (see, for example, U.S. Pat. No. 3,082,074, German Pat. No. 2,338,182 and E. J. Hewitt, loc. cit.).

The preparation of the fertilisers according to the invention can be carried out in various ways. For example, all the components, that is to say the gel-forming substance, crosslinking agent, water and ion exchange resin can be added to one another at one and the same time, and be mixed thoroughly. However, the components can also be added successively. Where polyisocyanate prepolymers or semi-prepolymers are used as the gel-forming substance, and a multi-stage procedure is employed, the prepolymer or semi-prepolymer is first mixed with a part of the water; the ion exchanger resin, moistened with the remainder of the water, is then introduced into this mixture. According to a technically particularly advantageous embodiment of this multi-stage process, the gel-forming substance is first thoroughly mixed with water and the dry ion exchange resin, in bead form, is then admixed.

In these procedures, the conveying, metering and mixing of the individual components or component mixtures can be effected with the devices which are in themselves known to those skilled in the art. For example, the ion exchange resin in bead form can be conveyed and metered by means of a suitable screw. The subsequent admixing of the ion exchange resin is carried out, for example, in a stirred mixing chamber.

The preparation of the fertilisers according to the invention can be carried out continuously or discontinuously. The procedure depends on the form which the fertiliser according to the invention is to have. If, for example, the fertiliser is to be introduced directly into a flowerpot saucer, to achieve adhesion to the saucer, a discontinuous procedure is advantageous. If, however, the fertiliser is to be produced in pieces of suitable dimensions, a continuous procedure is more advantageous. In that case, an endless sheet is first produced, which can then be cut into individual pieces.

In the case of continuous preparation, the gellable mixture containing nutrient can also be sprayed, cast or applied by a doctor before it soldifies as a result of gel formation. In such cases, the gellable mixture can be applied to a great diversity of materials, based on natural or synthetic raw materials, for example to slag wool mats, fleeces, knitted fabrics and other loop fabrics, sheets of foam, and woven fabrics.

The conditions during gel formation can also be varied so that either compact or foamed fertilisers are obtained. If, for example, air is whisked into the gellable mixture, foam gels are obtained.

Additionally to the nutrient-laden ion exchangers, a great variety of filter and additives can be incorporated into the fertilisers according to the invention, by admixing these additives to the water component when preparing the fertiliser. Examples of suitable fillers and reinforcing agents are carbon black or fibres of organic or inorganic origin. Examples of additives which can be introduced are dyestuffs, coloured pigments, inorganic or organic salts, minerals, algicides, fungicides, plant protection agents and growth regulators. These additives may be covered by a coating substance or may be present homogeneously dispersed in a solid resin. As examples of such coated additives may be mentioned inorganic salts such as calcium phosphate, calcium sulphate, magnesium sulphate. As coating substances or solid resins may be mentioned resins based on epoxides, polyesters, polyacrylates, polyethylene or polyurethanes, wax or sulfur.

The fertilisers according to the invention can be admixed to, or incorporated into, a great variety of natural and synthetic substrates in which plants grow. They can furthermore be used particularly advantageously as fertilisers in hydrocultures.

The fertilisers according to the invention can be employed in very diverse forms, for example as granules, slabs, sheets, blocks or rods.

The fertilisers are used in accordance with the methods customary in agriculture and in horticulture. For example, the fertilisers according to the invention can be mixed with the natural or synthetic substrate, or be incorporated into the soil by digging-over or by ploughing. The fertilisers according to the invention can furthermore be used with particular advantage as underlay plates, for fertilising plants in individual pots. The easy replacability of the handy moulded pieces after the ion exchanger has been exhausted is in this connection particularly useful. Furthermore, it has been found, surprisingly, that the long-term action of nutrient-laden ion exchangers in the form of the fertilisers according to the invention is substantially greater, for example when fertilising individual plants in hydrocultures, than is that of the ion exchangers in loose form.

The fertilisers according to the invention can optionally be used as a mixture with other fertilisers, extenders or emulsifiers and/or plant protection agents.

The amount in which the fertilisers according to the invention are employed can vary within wide ranges. It depends essentially on the particular nutrient requirement of the plants. In general, the amounts used are between 0.001 and 0.1 l per l of culture medium, preferably between 0.002 and 0.05 l per l of culture medium, when using granulated material or—when using moulded pieces—between 5 and 100 g per plant, preferably between 5 and 50 g per plant, expressed as the amount of incorporated ion exchangers.

The fertilisers according to the invention are suitable for providing a long-lasting and uniform supply to crop plants and decorative plants. The crop plants include, for example, kitchen herbs such as parsley (*Petroselinum sativum*), chives (*Allium schoenoprasum*) and marjoram (*Origanum majorana*); species of vegetables such as lettuce (*Lactuca sativa*), radishes (*Raphanus sativus*), cucumbers (*Cucumis sativus*) and tomatoes (*Solanum lycopersicum*); soft fruit such as strawberries (*Fragaria speciosa*), blackcurrants (*Ribes rubrum petraeum*), gooseberries (*Ribes grossularia*) and vines (Vitus vinifera); pineapple (*Ananas sativus*); varieties of citrus fruit; cherries (*Prunus*) and peaches (*Prunus persica*).

The following may be mentioned as examples of decorative plants: aechmea (*Aechmea fasciata*), ivy (*Hedera helix*), croton (*Codiaeum variegatum*), palm (*Chamaedorea elegans), philodendron (Philodendron red emerald; Philodendron scandens; Monstera deliciosa*), euphorbias (*Euphorbia pulcherrima*), ferns (*Adiantum scutum roseum*), rubber plants (*Ficus elastica Decora, Ficus robusta, Ficus diversifolia, Ficus benjamina*), aphelandra (*Aphelandra squarrosa dania*), marantha (*Maranta makoyana*), chrysanthemums (*Yellow Delaware*), anthuriums (*Anthurium scherzerianum*), heathers (*Erica gracilis*), azaleas (*Rhododendron simsii*), dieffenbachias (*Dieffenbachia amoena* Tropic white), dracaenas (*Dra-

*caena terminalis, Dracaena deremensis*), hibiscus (*Hibiscus rosasinensis*), lady's slipper (*Cypripedium*), guzmanias (*Gusmania minor*) pachystachys (*Pachystachys*), peperomia (*Peperomia glabella*), stag's horn fern (*Platycerium alcicorne*) scindapsus (*Scindapsus aureus*), spathiphyllum (*Spathiphyllum wallisii*) and freesias (*Vriesea splendens*).

An important advantage of the fertilisers according to the invention over the nutrient-containing inorganic, organic and natural hydrogels known from European patent application No. 0,006,299 resides in substantially improved structural stability.

The fertilisers according to the invention can be stored for unlimited periods, regardless of the water content of the gel, and within a wide temperature range, without their structure being destroyed or their fertilising activity declining.

A further advantage of the new fertilisers is that when they are introduced into aqueous substrates (culture media), they lose virtually no nutrient salts through uncontrolled diffusion. Hence, salt accumulation detrimental to plants does not occur when they are used. On the other hand, surprisingly, the release of nutrient is in no way hindered by the incorporation of the nutrient-laden ion exchangers into the hydrogels. The fertilisers according to the invention therefore represent a valuable improvement of the nutrient-containing polyurethane-polyurea hydrogels which can be prepared according to DT-OS No. (German Published Specification) 2,521,277. The fertilisers according to the invention differ from the foam-based growth media known from U.S. Pat. Nos. 2,988,441 and 3,373,009 through their gel structure and its high water content. Compared to these known growth media, the fertilisers according to the invention are distinguished by the fact that in them the release of nutrient from the incorporated nutrient-laden ion exchangers is not diffusion-hindered. Hence, when the fertilisers according to the invention are used, there is no need to ensure the capability for close contact between the plant roots and the nutrient-laden ion exchangers, so that—in contrast to the known foam-based growth media—the fertilisers according to the invention are universally applicable. The advantage of the fertilisers according to the invention, that they release nutrients unhindered, also applies relative to the use of nutrient-laden ion exchangers in small plastic containers (so-called nutrient batteries). These nutrient batteries have hitherto been used extensively in fertilisation of individual plants in hydrocultures, because of being easily replaceable after the exhaustion of the ion exchangers. However, with these nutrient batteries the amount of nutrient released by the ion exchangers to the plant roots per unit time and unit surface area is often too low, because of the low diffusion cross-section of the fertiliser batteries, to ensure that the nutrient demand of the plants is met.

The parts mentioned in the examples which follow are parts by weight, unless stated otherwise.

EXAMPLE 1

30 parts of the prepolymer A, whose preparation is described below, are dispersed in the course of 15 seconds, by vigorous stirring, in 70 parts of demineralised water which has a temperature of +5° C. 23 parts of the nutrient-containing, water-insoluble ion exchanger mixture J 1, whose preparation is described below, and which contains 40% by weight of water, are added all at once to this reaction mixture and are thoroughly stirred into it in the course of a further 15 seconds. The reaction mixture is then poured into an open mould (base area: 21×21 cm). 130 seconds after the start of mixing of the reactants, gel formation took place. During gel formation, the mixture foams up to a height of 4 mm. After a further 5 minutes, the fertiliser, obtained in the form of a foamed gel sheet (size: 21×21×0.4 cm) is taken out of the mould. This foamed gel sheet can be used, for example, as an underlay sheet for fertilisation of individual pots in hydrocultures. The content of (anhydrous) nutrient-laden ion exchanger mixture in the gel sheet obtained is 11% by weight of 80 g/dm$^3$. The total water content is 64% by weight or 450 g/dm$^3$.

The foamed gel sheet can also be used with particular advantage for lining containers intended for plant culture.

The prepolymer A used, and the nutrient-laden ion exchanger mixture J 1, were obtained as follows:

Prepolymer A

A mixture of 159 parts of toluylene diisocyanate (80% of 2,4-isomer and 20% of 2,6-isomer) and 1,200 parts of a polyether which has been obtained by addition reaction of 60% by weight of ethylene oxide and 40% by weight of propylene oxide with glycerol and has a hydroxyl number of 28, is warmed to 80° C. in the course of 30 minutes, whilst stirring. The reaction mixture is stirred at this temperature for a further 3 hours and is then cooled to room temperature. The prepolymer obtained has an isocyanate content of 3.7% and a viscosity of 9,500 mPas at 25° C.

Nutrient-laden ion exchanger mixture J 1

1,000 ml of a weakly basic anion exchanger in the free base form, prepared from a styrene bead polymer, crosslinked with 4% of divinylbenzene, by aminomethylation (content of weakly basic groups: 3 mols/l) are suspended in 1,000 ml of fully demineralised water and the following are added successively in the course of 3 hours at room temperature, whilst stirring: 5.96 g of ethylenediaminetetraacetic acid, 27 g of phosphoric acid (about 85% strength), 0.57 g of $Na_2B_4O_7.10\ H_2O$, 0.11 g of $(NH_4)_6Mo_7O_{24}.4\ H_2O$, 5 g of $FeSO_4.7\ H_2O$, 0.3 g of $MnSO_4.H_2O$, 0.045 g of $CuSO_4.5\ H_2O$, 0.05 g of $ZnSO_4.7\ H_2O$ and 250 g of nitric acid (about 65% strength). Thereafter, the following are introduced successively in the course of 2 hours into the suspension of the weakly basic anion exchanger which is laden with nitrate, phosphate and micro-nutrients, whilst stirring at room temperature: 570 ml of a commercial strongly acidic cation exchanger based on a styrene bead polymer crosslinked with 8% of divinylbenzene, 51.5 g of potassium hydroxide (85% strength) and 35 g of ammonia solution (about 25% strength).

After stirring for a further 16 hours, the pH value in the aqueous phase is 4.6. The ion exchanger mixture laden with nutrients is isolated by removing the aqueous phase on a suction filter.

Yield: 1,980 ml=1,630 g of ion exchanger mixture
Water content: 40%
Content of nitrate nitrogen: 20.4 mg/g
Content of ammonium nitrogen: 4.1 mg/g
Content of phosphorus: 4.7 mg/g
Content of potassium: 17.9 mg/g

EXAMPLE 2

3.4 parts of the prepolymer A described in Example 1 are dispersed, in the course of 15 seconds, by vigorous stirring, in 25.6 parts of demineralised water at a temperature of +5° C. 23 parts of the ion exchanger mixture J 1 described in Example 1 are added to this reaction mixture and stirred in vigorously in the course of a further 15 seconds. The reaction mixture is then poured into an open mould (base area: 11.5×21 cm). 115 seconds after the start of mixing of the reactants, gel formation occurs. This leads to a compact mass within 10 seconds. A massive gel sheet of dimensions 21×11.5×0.4 cm is obtained, which can be used, for example, as an underlay sheet for the fertilisation of individual pots in hydrocultures. The content of (anhydrous) nutrient-laden ion exchanger mixture in the sheet is 26% by weight or 140 g/dm$^3$. The total water content is 67% by weight or 360 g/dm$^3$.

EXAMPLE 3

23 parts of the prepolymer B described below are dispersed, in the course of 15 seconds, by vigorous stirring, in 117 parts of demineralised water (temperature: +5° C.). 190 parts of the nutrient-containing, water-insoluble ion exchanger mixture J 1 (water content: 40% by weight) are added, all at once, to this mixture and vigorously mixed in for 15 seconds. 110 seconds after the start of the mixing process, gel formation occurs. It leads, in the course of 10 seconds, to the formation of a resilient, compact hydrogel containing ion exchanger in bead form. This compact mass can be converted, by crushing, into a coarsely granular fertiliser which can be admixed to natural substrate. The content of (anhydrous) nutrient-laden ion exchanger mixture in the hydrogel is 34.5% by weight; the total water content is 58.5% by weight. The prepolymer B employed was obtained as follows:

A mixture of 256 parts of toluylene diisocyanate (80% by weight of 2,4-isomer and 20% by weight of 2,6-isomer) and 2,000 parts of a polyether which has been obtained by addition reaction of 40% by weight of ethylene oxide and 60% by weight of propylene oxide with glycerol and has a hydroxyl number of 21, is warmed to 80° C. in the course of 30 minutes, whilst stirring. The reaction mixture is stirred at this temperature for a further 3 hours and is then cooled to room temperature. The prepolymer obtained has an isocyanate group content of 4% by weight and a viscosity of 6,200 mPas at 25° C.

EXAMPLE 4

3 parts of prepolymer C, whose preparation is described below, are dispersed in the course of 30 seconds at a temperature of 25° C., by vigorous stirring, in 6 parts of demineralised water. 23 parts of the ion exchanger mixture J 1 which is described in Example 1 and contains 40% by weight of water are added to this reaction mixture and stirred in, over 25 seconds. 3 parts of a 5% strength by weight aqueous potassium hydroxide solution are then added and mixed in vigorously, in the course of 5 seconds. Gel formation takes place immediately and leads to a compact, resilient hydrogel. This compact hydrogel is distinguished by a particularly high content of nutrient ions. The content of (anhydrous) nutrient-laden ion exchanger mixture is 39.4% by weight. The total water content of the hydrogel is 51.6% by weight.

The prepolymer C employed had been obtained as follows:

865 parts of a polyether which has been obtained by addition reaction of 60% by weight of ethylene oxide and 40% by weight of propylene oxide with glycerol and has a hydroxyl number of 28 are mixed homogeneously with 135 parts of 1,6-hexamethylene diisocyanate and the reaction mixture is warmed to 105° C. It is stirred at this temperature for 7 hours and then cooled to room temperature. Thereafter, 0.1% by weight of benzoyl chloride is added and homogeneously stirred in. The prepolymer obtained has an isocyanate group content of 5.1% by weight and a viscosity (at 23° C.) of 7,400 mPas.

EXAMPLE 5

11.7 parts of demineralised water at a temperature of +5° C. and 1.3 parts of the prepolymer A described in Example 1 are mixed, in the course of 30 seconds, by vigorous stirring in a beaker. 19 parts of the nutrient-containing, water-insoluble ion exchanger mixture J 1, which is described in Example 1 and contains 40% by weight of water, are added all at once to this reaction mixture and vigorously stirred into the mixture in the course of a further 30 seconds. The reaction mixture is then poured into an open, circular mould (internal diameter: 9.5 cm). Gel formation takes place 110 seconds after the start of mixing of the components and is complete after a total of 5 minutes. The resulting stable 3.5 mm thick circular hydrogel disc is taken out of the mould. It is very suitable for use as an underlay sheet for fertilising individual plants in pots containing soil substrate. The content of (anhydrous) nutrient-laden ion exchanger mixture in the hydrogel disc is 35.6% by weight or 410 g/dm$^3$. The total water content of the hydrogel disc is 60% by weight or 690 g/dm$^3$.

EXAMPLE 6

The procedure described in Example 5 is followed, except that in place of the ion exchanger mixture J 1 an ion exchanger mixture J 2, whose preparation is described below, is used. Again, a circular hydrogel disc is obtained, which is outstandingly suitable for use as an underlay sheet for the fertilisation of individual pots. It is advantageously employed when the water used to water the plants has only a low salt content. The content of (anhydrous) nutrient-laden ion exchanger mixture in the hydrogel disc is 35% by weight; the total water content of the disc is 60% by weight.

The ion exchanger mixture J 2 employed was obtained as follows:

Ion exchanger mixture J 2

To prepare the ion exchanger mixture J 2, which is laden with the principal nutrients nitrogen, phosporus and potassium, and with micro-nutrients, 490 ml of the moist weakly basic anion exchanger AA laden with nitrate, phosphate and micro-nutrients, this exchanger being described below, and 150 ml of the weakly acidic cation exchanger KA, laden with potassium and ammonium, this exchanger also being described below, are mixed and the mixture is partially dried in a rotary evaporator in vacuo (24 mbar) at 60° C. Yield, 315 g of a free-flowing mixture:

Water content: 7%
Nitrate nitrogen content: 35.2 mg/g
Ammonium nitrogen content: 7.0 mg/g
Phosphorus content: 7.8 mg/g
Potassium content: 30.0 mg/g The nutrient-laden resins AA and KA employed were obtained as follows:

Resin AA 1,000 ml of a weakly basic ion exchanger in the free base form, prepared from a styrene bead polymer, crosslinked with 4% of divinylbenzene, by aminomethylation (content of weakly basic groups: 3 mols/l) are suspended in 1,000 ml of fully demineralised water and the following are added successively in the course of 3 hours whilst stirring at room temperature: 5.96 g of ethylenediaminetetraacetic acid, 27 g of phosphoric acid (about 85% strength), 0.57 g of $Na_2B_4O_7.10\ H_2O$, 0.11 g of $(NH_4)_6Mo_7O_{24}.4\ H_2O$, 5 g of $FeSO_4.7\ H_2O$, 0.3 g of $MnSO_4.H_2O$, 0.045 g of $CuSO_4.5\ H_2O$, 0.05 g of $ZnSO_4.7\ H_2O$ and 250 g of nitric acid (about 65% strength). After stirring for a further 20 hours, the pH value in the aqueous phase is 4.5. The anion exchange resin laden in this way is separated from the aqueous phase by suction filtration.

Yield, 1,440 ml of moist product.

Resin KA 1,000 ml of a weakly acidic cation exchanger in the acid form (content of weak acid groups: 4.6 mol/l), prepared by acid hydrolysis of an acrylonitrile bead polymer crosslinked with 7% of divinylbenzene and 2% of octa-1,7-diene, are suspended in a solution of 3.75 g of potassium chloride in 1 l of fully demineralised water, and 183 g of potassium hydroxide (in the form of an 84% strength aqueous solution) are added in the course of 25 minutes, whilst stirring and cooling at 20° to 25° C. After stirring for a further 3 hours, the aqueous phase has assumed a pH value of 7.3. Thereafter, 135 ml of aqueous ammonia solution (about 25% strength) are added dropwise in the course of 2.75 hours, at the same temperature. In the course thereof, the pH value rises to 9.4. After stirring for a further 16 hours, the pH value is 9.2. The weakly acidic cation exchange resin which has been laden in this way is filtered off with suction.

Yield: 1,620 ml of moist cation exchange resin.

EXAMPLE 7

Fertilisation experiments on decorative plants in hydroculture

Comparative fertilisation experiments were carried out on decorative plants in hydroculture, using the fertilisers according to the invention described in Example 1 (foamed gel sheet, content of nutrient-laden ion exchanger mixture 23 g) and Example 2 (massive gel sheet, content of nutrient-laden ion exchanger mixture 23 g) as well as with the nutrient-laden ion exchanger mixture J 1 in bead form (in an amount of 23 g per plant), this mixture having been used to prepare both the sheets.

The ready-for-sale plants, potted in expanded clay, were cultured under greenhouse conditions in water trays (21×26 cm) into which the sheets were placed or the ion exchanger mixture in bead form was sprinkled. The plants were watered with tapwater having a salt content corresponding to 800 μS/cm (20° C.). The usual practice was to keep the water level at between 4 cm and 1 cm height.

The experiments were carried out with 4 species of plants: Cissus rhombifolia, Hibiscus "hybrids", *Philodendron scandens* and *Dracaena marginata*. 4 plants of each species were employed. The duration of the experiment (culture time) was 270 days in the case of Philodendron scandens and 195 days in the case of all the other plants.

At the end of the experiment, the growth in length was determined in the case of *Dracaena marginata*. All the other plants were cut back and the new growth was determined from the green weight of the cut-off shoots or runners.

In the table which follows, the results of the measurements are given as mean values for each species of plant.

TABLE

| Plant species Item measured | Culture time days | Plant growth New growth | | Comparison fertiliser (ion exchanger mixture J 1) |
|---|---|---|---|---|
| | | Fertiliser according to Example | | |
| | | 1 | 2 | |
| Cissus shoot weight (g) | 195 | 174 | 166 | 150 |
| Hibiscus shoot weight (g) | 195 | 115 | 126 | 105 |
| Philodendron runner weight (g) | 270 | 321 | 299 | 251 |
| Dracaena length (cm) | 195 | 13 | 15 | 11 |

It emerges from the measured values listed in the table that the plants fertilised with the fertilisers according to the invention showed greater growth than the plants fertilised with the pure ion exchanger mixture J 1. The differences in new growth were 10% to 36%.

EXAMPLE 8

Fertilisation experiment with decorative plants in soil culture

Comparative fertilisation experiments with decorative plants in soil culture were carried out with the fertiliser according to the invention, described in Example 5, and the nutrient-laden, ion exchanger mixture J 1 in bead form used to prepare these composite discs. For these experiments, plastic pots (lower pot diameter 11 cm), containing the ready-for-sale plants potted in peat culture substrate are placed in saucers (diameter 14.5 cm, rim 4 cm high) and at the same time, for each pot, a fertiliser disc according to the invention, having a diameter of 9.5 cm and containing 19 g of nutrient-laden ion exchanger mixture, or 19 g of ion exchanger mixture J 1 in bead form, were placed under the plant pots. The plants were watered with tapwater having a salt content corresponding to 800 μS/cm (20° C.). The water was introduced in portions, at intervals of 2 to 4 days, into the saucers, in accordance with the requirement of the plants, the portions being so chosen that the water was completely absorbed in the course of 1 to 2 hours.

The experiments were carried out under greenhouse conditions with 2 species of plants, Hedera helix and Cissus rhombifolia. 4 plants (4 pots) of each species were employed. The duration of the experiment was 173 days. At the end of the experiment, the plants were cut back and the new growth was determined from the green weight of the cut-off runners. The results of the measurements are shown in the table below, as mean values per species of plant per pot.

TABLE

| Species of plant | Plant growth New growth: runner weight in g | |
|---|---|---|
| | Fertiliser according to Example 5 | Comparison fertiliser (ion exchanger mixture J 1) |
| *Hedera helix* | 89 | 73 |

TABLE-continued

| | Plant growth New growth: runner weight in g | |
|---|---|---|
| Species of plant | Fertiliser according to Example 5 | Comparison fertiliser (ion exchanger mixture J 1) |
| Cissus rhombifolia | 164 | 153 |

It emerges from the measured values shown in the table that the plants of Hedera helix fertilised with the fertiliser according to the invention show substantially greater growth than the plants in the comparison experiment. The difference in new growth was here 22%. In the case of Cissus rhombifolia, 8% stronger growth was found. In addition, all plants supplied with the fertiliser according to the invention, when rated from general horticultural points of view (habit and leaf colour) were always assessed to be about 0.5 of a point better (on a five-point rating scale) than the plants from the comparison experiment.

Similarly good growth results were achieved with the fertilisers according to the invention in the case of the following decorative plants, in soil culture: *Schefflera actinophylla, Ficus benjamina, Codiacum variegatum, Monstera deliciosa, Dracaena fragans* "Massangeana", *Nephrolepis exaltata, Spathiphyllum wallisii, Begonia Elatior*-hybrids, *Saintpaulia ionantha, Kalanchoe blossfeldiana, Pachypodium camerei, Euphorbia trigona,* a range of cacti, *Campanula isophylla, Exacum affine,* Vinca, *Beloperone guttata, Pachystachys lutea* and *Cissus antarctica.*

What is claimed is:

1. A fertiliser based on a hydrogel containing plant nutrients comprising a covalently crosslinked polyurethane-polyurea containing hydrogel or a modified polyurethane-polyurea containing hydrogel in which are embedded ion exchangers which are laden with plant nutrients, said polyurethane-polyurea prepared from a reaction mixture comprising prepolymer and/or semi-prepolymer gel-forming substances containing isocyanate groups, and cross-linking agents.

2. The fertiliser according to claim 1 wherein the ratio of plant nutrient-laden ion exchanger to hydrogel is 10:90 to 90:10.

3. The fertiliser according to claim 1 wherein the ratio of plant nutrient-laden ion exchanger to hydrogel is 30:70 to 70:30.

4. The fertiliser according to claim 1 wherein the content of said polyurethane-polyurea or modified polyurethane-polurea in the hydrogel is at least 5% by weight relative to the total weight of the hydrogel.

5. The fertiliser according to claim 1 wherein the content of said polyurethane-polyurea or modified polyurethane-polyurea in the hydrogel is 5 to 40% by weight relative to the total weight of the hydrogel.

6. The fertiliser according to claim 1 wherein the weight ratio of gel-forming substance to crosslinking agent in the said polyurethane-polyurea or modified polyurethane-polyurea is 1:0.01 to 0.5.

7. The fertiliser according to claim 1 wherein the weight ratio of gel-forming substance to crosslinking agent in the said polyurethane-polyurea or modified polyurethane-polyurea is 1:0.03 to 0.3.

8. The fertiliser according to claim 1 wherein the content of isocyanate groups in the prepolymer or semi-prepolymer is 2 to 10% by weight, relative to the weight of the prepolymer or semi-prepolymer.

9. The fertiliser according to claim 1 wherein the content of isocyanate groups in the prepolymer is 3 to 5% by weight, relative to the weight of the prepolymer or semi-prepolymer.

10. The fertiliser according to claim 1 wherein the ion exchangers laden with plant nutrients are mixtures of anion exchangers laden with nutrient anions and cation exchangers laden with nutrient cations.

11. The fertiliser according to claim 11 wherein the anion exchanger laden with nutrient anions is laden with anionic chelate complexes of micro-nutrient cations and with further macro-nutrient and micro-nutrient anions.

12. A process for the long term and uniform supply of plants with nutrient ions comprising applying to the plants or their environment as a fertiliser a covalently crosslinked polyurethane-polyurea containing hydrogel or a modified polyurethane-polyurea containing hydrogel in which are embedded ion exchangers which are laden with plant nutrients, said polyurethane-polyurea prepared from a reaction mixture comprising prepolymer and/or semi-prepolymer gel-forming substances containing isocyanate groups, and cross-linking agents.

13. The process of claim 12 wherein in the fertiliser the ratio of plant nutrient-laden ion exchanger to hydrogel is 10:90 to 90:10.

14. The process of claim 12 wherein in the fertilizer the ratio of plant nutrient-laden ion exchanger to hydrogel is 30:70 to 70:30.

15. The process of claim 12 wherein in the fertilizer the content of said polyurethane-polyurea or modified polyurethane-polyurea in the hydrogel is 5 to 40% by weight relative to the total weight of the hydrogel.

16. The process of claim 12 wherein the fertilizer the weight ratio of gel-forming substance to crosslinking agent in the said polyurethane-polyurea or modified polyurethane-polyurea is 1:0.01 to 0.5.

17. The process of claim 12 wherein in the fertiliser the weight ratio of gel-forming substance to crosslinking agent in the said polyurethane-polyurea or modified polyurethane-polyurea is 1:0.03 to 0.3.

18. The process of claim 12 wherein in the fertiliser the covalently crosslinked hydrogel is a modified polyurethane-polyurea hydrogel.

19. Process according to claim 18 wherein in the fertiliser the content of isocyanate groups in the prepolymer or semi-prepolymer is 2 to 10% by weight, relative to the weight of the prepolymer or semi-prepolymer.

20. Process according to claim 18 wherein in the fertiliser the content of isocyanate groups in the prepolymer or semi-prepolymer is 3 to 5% by weight, relative to the weight of the prepolymer or semi-prepolymer.

21. The process of claim 12 wherein in the fertiliser the ion exchangers laden with plant nutrients are mixtures of anion exchangers laden with nutrient anions and cation exchangers laden with nutrient cations.

22. The process of claim 12 wherein in the fertiliser the anion exchanger laden with nutrient anions is laden with anionic chelate complexes of micro-nutrient cations and with further macro-nutrient and micro-nutrient anions.

* * * * *